United States Patent

Krolla et al.

[11] Patent Number: 5,446,008
[45] Date of Patent: Aug. 29, 1995

[54] TRANSPARENT OR TRANSLUCENT INORGANIC MATERIAL WITH HIGH TRANSMISSION IN THE 2700–3300 NM WAVELENGTH RANGE

[75] Inventors: Georg Krolla; Paul Kissl; Peter Nass, all of Mainz; Kurt Schaupert, Hofheim, all of Germany

[73] Assignee: Schott Glaswerke, Mainz, Germany

[21] Appl. No.: 165,877

[22] Filed: Dec. 14, 1993

[30] Foreign Application Priority Data

Jun. 26, 1993 [DE] Germany .............. 43 21 373.1

[51] Int. Cl.$^6$ ............................................. C03C 3/083
[52] U.S. Cl. ........................................ 501/68; 501/4; 501/7; 501/63; 501/69; 501/71
[58] Field of Search ............ 501/4, 7, 63, 69, 71, 501/68

[56] References Cited

U.S. PATENT DOCUMENTS

| | | |
|---|---|---|
| 3,531,305 | 9/1970 | Dumbaugh . |
| 3,617,317 | 11/1971 | Sack . |
| 3,788,865 | 1/1974 | Babcock et al. . |
| 4,007,048 | 2/1977 | Sack et al. . |
| 4,057,434 | 11/1977 | Rittler . |
| 4,057,670 | 11/1977 | Scheidler . |
| 4,100,001 | 7/1978 | Franklin ............... 501/69 X |
| 4,211,820 | 7/1980 | Cantaloupe et al. . |
| 4,575,493 | 3/1986 | Rauch, Sr. . |
| 4,851,372 | 7/1989 | Lindig et al. .......... 501/69 X |
| 5,212,122 | 5/1993 | Pannhorst et al. . |

FOREIGN PATENT DOCUMENTS 1053747  11/1959  Germany .
938301   1/1964   United Kingdom .

OTHER PUBLICATIONS

Horst Scholze, "Glas Natur, Struktur und Eigenschaften", pp. 222–223. (1988) no month.
Schott Information, No. 2/1984 no month.

*Primary Examiner*—Karl Group
*Attorney, Agent, or Firm*—Millen, White, Zelano & Branigan

[57] ABSTRACT

A transparent or translucent inorganic material, especially a glass-ceramic and/or composite material, is provided with a low average thermal longitudinal expansion coefficient, α, of from $-1\times10^{-6} K^{-1}$ to $+2\times10^{-6} K^{-1}$ in the temperature range of $-50°$–$700°$ C., with the following composition (in weight percent): $Li_2O$, 2.5–6.0; $Na_2O$, 0–4.0; $K_2O$, 0–4.0; $Na_2O+K_2O$, 0.2–4.0; MgO, 0–3.0; ZnO, 0–3.0; BaO, 0–3.5; CaO, 0–1.0; SrO, 0–1.0; $Al_2O_3$, 18–28; $SiO_2$, 50–70; $TiO_2$, 1.0–7.0; $ZrO_2$, 0–3.5; $TiO_2+ZrO_2$, 1.0–7.0; and $P_2O_5$, 0–8.0, optionally with coloring components (in weight percent):
$V_2O_5$, 0–2.0; $Cr_2O_3$, 0–2.0; MnO, 0–2.0; $Fe_2O_3$, 0–2.0; CoO, 0–2.0; and NiO, 0–2.0, optionally, conventional refining agents, such as $As_2O_3$, $Sb_2O_3$, NaCl, and $Ce_2O_3$, and optionally with high quartz (h-quartz) and/or keatite mixed crystals as the essential crystalline phase. The material exhibits a settable transmission and is suitable, in particular, for the production of plates, pipes, and molded articles, wherein the inorganic material has a water content of less than 0.03 mol/l.

7 Claims, 7 Drawing Sheets

TRANSPARENT OR TRANSLUCENT INORGANIC MATERIAL WITH HIGH TRANSMISSION IN THE 2700–3300 NM WAVELENGTH RANGE

FIELD OF THE INVENTION

The invention relates to a transparent or translucent inorganic material, especially a glass-ceramic and/or a composite material, having a low thermal expansion coefficient, α, of from $-1 \times 10^{-6}$ K$^{-1}$ to $+2 \times 10^{-1}$ K$^{-1}$ in the temperature range of $-50°$ C. to 700° C., with the following composition (in weight percent):

Li$_2$O, 2.5–6.0; Na$_2$O, 0–4.0; K$_2$O, 0–4.0; Na$_2$O+K$_2$O, 0.2–4.0; MgO, 0–3.0; ZnO, 0–3.0; BaO, 0–3.5; CaO, 0–1.0; SrO, 0–1.0; Al$_2$O$_3$, 18–28; SiO$_2$, 50–70; TiO$_2$, 1.0–7.0; ZrO$_2$, 0–3.5; TiO$_2$+ZrO$_2$, 1.0–7.0; and P$_2$O$_5$, 0–8.0, optionally with coloring components (in weight percent):

V$_2$O$_5$, 0–2.0; Cr$_2$O$_3$, 0–2.0; MnO$_2$, 0–2.0; Fe$_2$O$_3$, 0–2.0; CoO, 0–2.0; and NiO, 0–2.0, If desired, the material may also include conventional refining agents, such as As$_2$O$_3$, Sb$_2$O$_3$, NaCl, and Ce$_2$O$_3$, and/or may also optionally include high quartz (h-quartz) and/or keatite mixed crystals as an essential crystalline phase. The material exhibits a settable wavelength transmission and is suitable, for example, for the production of plates, pipes, or molded articles. The invention also relates to a process for the manufacture of the material and its use.

BACKGROUND OF THE INVENTION

Inorganic materials, such as glass-ceramics, which are transparent or translucent in the visible wavelength range and show high stability with regard to temperature fluctuations and which are utilized, for example, as hot plates, are known and commercially available. These glass-ceramics are colored by means of coloring oxides, such as MnO$_2$, Fe$_2$O$_3$, NiO, CoO, Cr$_2$O$_3$, V$_2$O$_5$, and CuO. The effect of these coloring oxides on coloration, i.e., the absorption in the visible wavelength region, is discussed in the prior art.

Thus, DE-AS 1,596,858 describes the effect of the individual oxides CoO, Cr$_2$O$_3$, NiO, and Fe$_2$O$_3$, as well as CoO in combination with MnO$_2$ and CuO, on transmission in the visible wavelength region.

U.S. Pat. No. 3,788,865 examines the effect of combinations of two oxides selected from CoO, NiO, Fe$_2$O$_3$, Cr$_2$O$_3$, MnO$_2$, and CuO on the transmission in the wavelength range from 400–700 nm. Moreover, the simultaneous effect of the three oxides NiO, CoO and Fe$_2$O$_3$, as well as that of V$_2$O$_5$, on the transmission is described. Although no measured results are provided, it is pointed out that the V$_2$O$_5$-containing glass-ceramic shows good transparency in the IR range.

German Patent 2,429,563 discloses the combined effect of the four oxides CoO, NiO, Fe$_2$O$_3$, and MnO$_2$ on the transmission. In the wavelength region from 700–800 nm, a transmission of above 70% is observed, dependent on the hue of transmitted light, while the IR transmission drops, for certain wavelengths, to below 10%.

U.S. Pat. No. 4,211,820 describes a brown glass-ceramic wherein the dye effect is obtained by TiO$_2$ and V$_2$O$_5$. Besides these oxides, only Fe$_2$O$_3$ is contained therein in minor amounts as the coloring oxide. The characterization of the transmission is inadequate, and one can only speculate that the brown coloring is obtained by measuring the transmission on 5 mm thick specimens at λ=800 nm. There is no data regarding transmission in the IR range.

Finally, EP 0 220 333 B1 discloses a transparent glass-ceramic containing high quartz mixed crystals which appears black in incident light and violet or brown to dark red in transmitted light. It is especially suited for the production of hot plates, wherein the change, caused by temperature stresses, in the linear thermal expansion coefficient and transmission is small. The transmission in the IR range can be variably adjusted between 800 nm and 2.6 μm, and the glass-ceramic starting material has the following composition (in weight percent):

SiO$_2$, 62–68; Al$_2$O$_3$, 19.5–22.5; Li$_2$O, 3.0–4.0; Na$_2$O, 0–1.0; K$_2$O, 0–1.0; BaO, 1.5–3.5; CaO, 0–1.0; MgO, 0–0.5; ZnO, 0.5–2.5; TiO$_2$, 1.5–5.0; ZrO$_2$, 0–3.0; MnO$_2$, 0–0.4; Fe$_2$O$_3$, 0–0.2; CoO, 0–0.3; NiO, 0–0.3; V$_2$O$_5$, 0–0.8; Cr$_2$O$_3$, 0–0.2; F, 0–0.2; Sb$_2$O$_3$, 0–2.0; As$_2$O$_3$, 0–2.0; Σ Na$_2$O+K$_2$O, 0.5–1.5; Σ BaO+CaO, 1.5–4.0; Σ TiO$_2$+ZrO$_2$, 3.5–5.5; and Σ Sb$_2$O$_3$+As$_2$O$_3$, 0.5–2.5, wherein the coloring is made possible by combining oxides selected from the group consisting of V$_2$O$_5$, NiO, CoO, MnO$_2$, Fe$_2$O$_3$, and Cr$_2$O$_3$. The glass-ceramic is converted from this glass-ceramic starting material by a heat treatment of from 680°–920° C.

As can be seen from the aforementioned patents, the effect of coloring oxides on transmission in the visible range of the h-quartz mixed crystal-containing glass-ceramics has been examined in detail. According to the art, it is possible, for example, to manufacture in a controlled fashion heatable plates having a thickness of about 4 mm, which appear opaque (black) in incident light and, in transmitted light, violet, brown, up to dark red. Due to these properties, heating elements used with a cooking surface or in similar applications are clearly visible during operation, while they are not visible through the cooking surface in the unused condition.

In contrast to the transmission in the visible wavelength region, the effect of the coloring oxides on transmission in the IR region of wavelengths higher than 2.6 μm has not been studied in detail.

U.S. Pat. No. 4,057,434 describes an opaque glass-ceramic having a thermal expansion coefficient (20°–700° C.) of less than $15 \times 10^{-7}$/K, with excellent chemical stability, and an infrared transmission at a wavelength of 3.5 μm through a polished plate having a thickness of 4.25 mm of more than 40%. The glass-ceramic has β-spodumene as the single crystalline phase consisting of (in weight percent on oxide basis) 2.5–4.5%, Li$_2$O; 0.75–3.5%, ZnO; 17.5–21%, Al$_2$O$_3$; 65–71%, SiO$_2$; and 3.5–6%, TiO$_2$, and being essentially devoid of alkaline earth oxides and alkali oxides, except for Li$_2$O and ZrO$_2$.

U.S. Pat. No. 4,575,493 relates to an infrared-permeable glass having a thermal expansion coefficient of less than $4.24 \times 10^{-6}$/° C., measured at 25°–300° C., consisting of (in mol%) ZnO, 15–30; Al$_2$O$_3$, 2–10; Ta$_2$O$_5$, 2–15; and GeO$_2$, 40–75.

Of the commercially available glass-ceramics, e.g., by Corning, Corning Code 9632, it is known that glass-ceramics colored with V$_2$O$_5$ have a very high transmission in the IR range of 1–2.6 μm, namely, about 80% for specimens with a thickness of 4 mm Also, CERAN ® "HIGH TRANS" TM, glass-ceramic cooking surfaces sold by Schott colored with V$_2$O$_5$, exhibit a very high IR transmission of about 80% for 3 mm thick specimens (up to $\lambda=2.6$ μm).

In the wavelength range of 2.7–3.3 μm, however, IR transmission drops to very low values in all glass-ceramics presently on the market, for example, to below 5% at a wavelength of 2.8 μm for a glass-ceramic plate with a thickness of 3 mm.

For example, when hot plates are used as a cooking surface, IR transmission is one of the determining variables for good efficiency of the cooking system, i.e., short warm-up times and low energy consumption. The most common heating elements with open heating coils radiate in the range from 2.7–3.3 μm with 80–95% of their maximum emission. However, precisely this range is absorbed by the materials presently on the market. Therefore, the radiated energy is not directly available at the bottom of the pan but rather only by way of thermal conduction or secondary radiation of the heated cooking surface.

It is shown in German Patent 2,437,026, as well as "Schott Information 2/84", that it is very difficult to optimize a cooking system, especially due to varying configurations of cooking vessel surfaces, but that such optimization is possible, in substantial part, by changing the IR transmission of the cooking surface.

Also, the development of heating units for glass-ceramic is ongoing. It is definitely possible, for example, to envision future heating systems exhibiting a different radiation characteristic from present the heating units and/or constructed of several heating zones with differing radiation temperatures and/or characteristics.

These heating systems are to be taken into account, as well, in the development of an optimized glass-ceramic.

SUMMARY OF THE INVENTION

It is an object of the present invention to provide cooking systems with improved energy transport from the heating element to the cookware. The energy transport is to be improved especially in case of cookware having "poor" properties with regard to heat dissipation by buckled pan bottoms so that the usage properties are not substantially poorer than those in "good" cookware. At the same time, the other essential characteristics of the cooking surface must be preserved. In the visual range, the transmission must be set so that turned-on heating elements are visible even at low power, but, at full power, a person's eyes are protected from damaging radiation and glare. The plate must absorb light to such an extent that it appears opaque in the unheated zone in incident light. Also, the material compositions heretofore used with success are to be altered as little as possible.

In order to obtain the variability of transmission in the IR range, the combinations of coloring oxides utilized had to be expanded from what was previously known; otherwise, it would be impossible to simultaneously attain strong absorption in the visible range up to about 600 nm and variable absorption in the IR range. Of the two coloring oxides, $Cr_2O_3$ and $V_2O_5$, with strong absorption up to about 600 nm in h-quartz mixed crystal-containing glass-ceramics and with very good transparency starting at about 1000 nm, $Cr_2O_3$, for example, can be employed only in very small amounts, since it allows the upper devitrification temperature to rise greatly, and the associated glasses cannot be processed.

However, this is merely one of the many difficulties encountered in attempting to adjust the IR transmission by way of a combination of coloring oxides, wherein the adjustability is additionally restricted to a wavelength range of up to 2.6 μm.

It is another object of the present invention to provide inorganic materials, for example, glass-ceramics, with an increased total transmission, wherein the transmission in the near infrared (600 nm to 2 μm) is low due to coloring oxides for coloration in the visible region.

It is a further object of the invention to provide an inorganic material, especially a glass-ceramic which contains h-quartz and/or keatite mixed crystals, having an adequate stability under extreme conditions with respect to temperature/time stresses as they occur, for example, when used as a cooking surface, as cookware, or as a dome for an IR detector in airplanes.

A still further object of the invention is to provide a method for manufacturing the inorganic materials discussed above.

The stability with respect to the above-mentioned conversion to glass-ceramics can be specified in various ways. In German Patent 2,429,563, a certain ceraming program was repeatedly performed, and the variation in the linear thermal expansion coefficient was determined between the temperatures 20°–700° C., $\alpha_{20/700}$, depending on the number of conversion cycles. By "ceraming" is meant the process by which mixed crystals are formed in a glass to prepare a glass-ceramic.

Upon further study of the specification and appended claims, further objects and advantages of this invention will become apparent to those skilled in the art.

It has surprisingly been found that the objects of the invention are attained by an inorganic material having a variably adjustable and settable IR transmission in the wavelength range of from about 2.7 to 3.3 μm and a water content of less than 0.03 mol/l. The transmission in the wavelength range of 2.7–3.3 μm for the novel materials is greatly increased over known materials. Known materials have been effective only in a spectral region of between 1.0–2.5 μm.

According to the invention, it is possible to set the transmission in the visible and near-infrared spectral region, as indicated above, by the corresponding selection of nucleating agents, doping with color-imparting oxides and a choice of ceraming parameters within large ranges. Also, it is possible to determine and set the transmission in the spectral region above about 2.5 μm by controlling the water content of the glass-ceramic. High transmission in this spectral region is advantageous for many applications of glass-ceramics. Thus, for example, the heat radiation transmission of a conventional heating element, as utilized in cooking areas, may be increased by up to 40% using the novel materials of the present invention as a cooking surface.

DETAILED DESCRIPTION OF THE PREFERRED EMBODIMENTS

Figure 1:
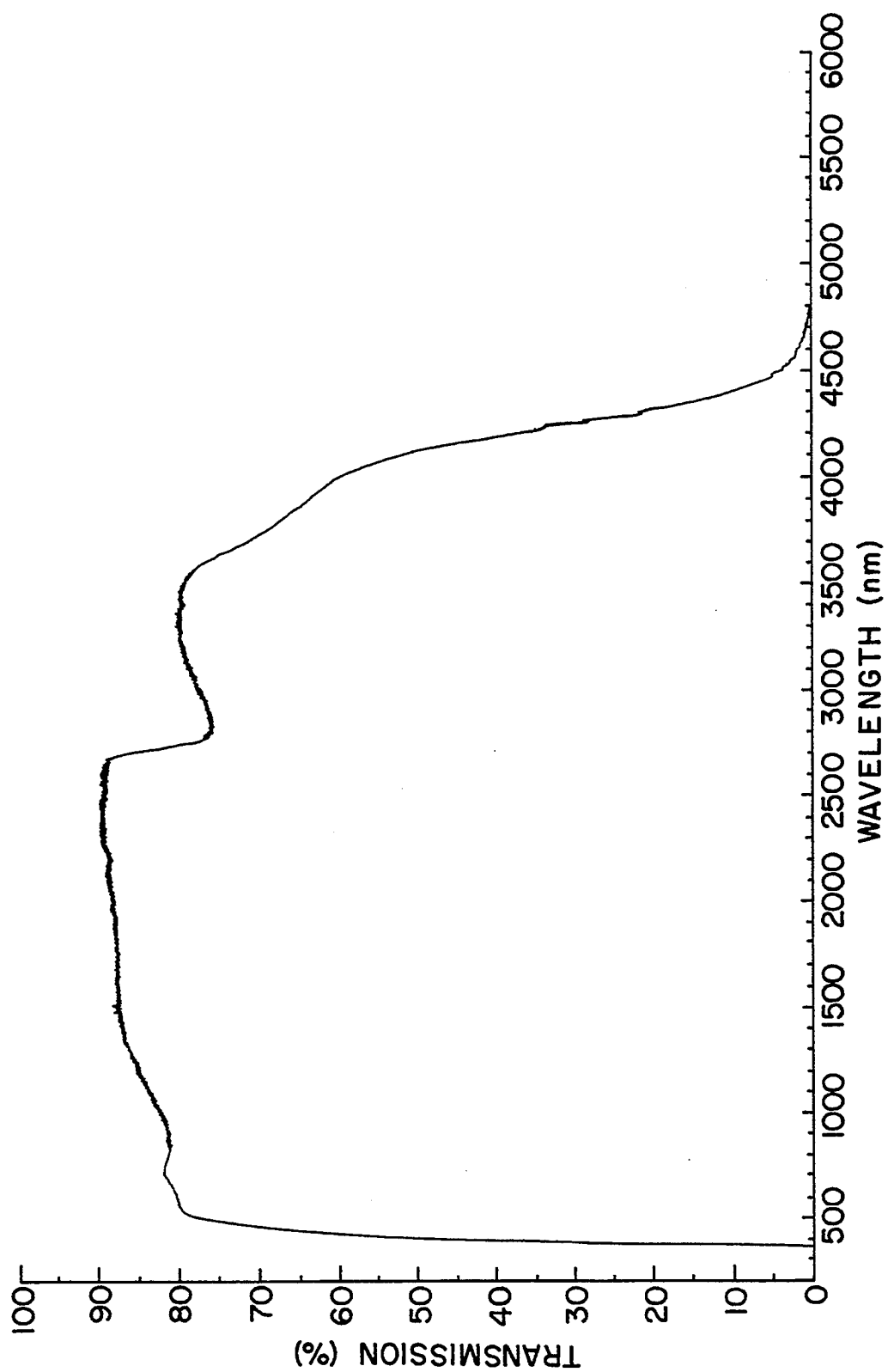
FIG. 1 is a graph of the transmission against wavelength for the cooled glass prepared in Example 1 below.

Conventional glass-ceramic compositions typically exhibit water contents of 0.04 weight % (=0.06 mol/l) or more.

The water content of an inorganic material, such as a glass-ceramic, is determined by way of the transmission in the wavelength range between 2.5 and 5.0 $\mu$m, for example, with an infrared spectrometer, Perkin-Elmer Model 682, on specimens with a thickness of 3 mm, using the following procedure (see also FIGS. 1–7):

From the transmission measurement, the T value is determined at the water band at about 2.8 $\mu$m, and the extinction (E) is calculated according to the formula:

$$E = 1/d \times \log_{10} 1/T_i (\text{cm}^{-1}),$$

wherein d is the thickness of specimen (cm), and $T_i$ is the pure transmission value. Ti is calculated by the equation:

$$T_i = T/P,$$

wherein P is the reflection factor $= 2n/n^2 + 1$, wherein n is the refractive index of the material. The water content (c) is calculated from the equation:

$$c = E/\epsilon (\text{mol/l}),$$

wherein the decadic extinction coefficient, $\epsilon$, in $(1 \times \text{mol}^{-1} \times \text{cm}^{-1})$ can be derived, for example, from the works of H. Franz, H. Scholze, *Glastechn. Berichte* [*Glass Technology Reports*] 36, 1963, p. 350; H. Franz, *Glastechn. Berichte* 38, 1965, p. 57; and. H. Franz, *J. Am. Ceram. Soc.* 49, 1966, p. 475.

It is known that glass-ceramics based on $LiO_2$—$Al_2O_3$—$SiO_2$ with high quartz mixed crystals as the essential crystalline phase exhibit a low thermal expansion over wide temperature ranges. To produce this glass-ceramic, a glass is first melted which contains $TiO_2$ and optionally $ZrO_2$ as the nucleating agents for the subsequent crystallization, in addition to the primary components $LiO_2$, $Al_2O_3$ and $SiO_2$ necessary for the high quartz mixed crystal formation. Frequently, $GeO_2$, $MgO$, $ZnO$ and $P_2O_5$, are also added. $GeO_2$ improves the glass forming process in a similar manner to $SiO_2$. With variations of the relative concentrations of $Li_2O$, $MgO$, $ZnO$ and $P_2O_5$, the thermal expansion behavior of the glass ceramic can be controlled. Incorporation of these oxides allows the temperature range for which low thermal expansion is observed to be broadened or restricted. Addition of the alkalis $Na_2O$ and $K_2O$, as well as $BaO$, $CaO$ and $SrO$, improves the meltability of the glass. The glass is then formed directly from the melt, e.g., into plates by rolling or also by drawing, or also into tubes and rods by drawing over correspondingly shaped dies. In a second temperature process, the so-called ceraming, the high quartz mixed crystals are formed in the glass and, thus, a thermal expansion is set that is close to zero. The content of the nucleating agents $TiO_2$ and $ZrO_2$ in the glass may be adjusted and the ceraming parameters chosen to obtain a suitable crystalline density such that highly transparent glass-ceramics can be produced with this method. By adding coloring components, such as Fe, Ni, Co, Mn, Cr and V, it is possible to set desired transmission changes and consequently also adjust the colors of the glass-ceramics. To study the glass ceramic properties, for example, specimens were heated at 4° C./min to 720° C., kept at 720° C. for one hour, heated at 2° C./min to 880° C. for 90 minutes, and finally cooled down to room temperature after switching off the furnace.

Such glass-ceramics find broad applications in areas requiring a high stability to temperature fluctuations and/or dimensional stability at temperature cycles.

In a preferred embodiment, the water content in the glass-ceramic of this invention is set to values of less than 0.01 mol/l, particularly to less than 0.005 mol/l, because such low water contents in the glass-ceramic lead to high transmission values in the wavelength range of between 2700–3300 nm. For example, transmissions of more than 40%, and preferably more than 60% (for glass articles of 3 mm in thickness), can be obtained.

The following methods are suitable in this connection for the reduction and extensive removal of the OH-ions, i.e., reduction in water content, in glasses which absorb in the wavelength range $\lambda$ of about 2.5–3.5 $\mu$m:

1. Chemical Dehydration

In this process, OH-groups firmly incorporated into the glass network (free OH-groups and hydrogen bridge bonds) are converted into readily volatile compounds. See, for example, U.S. Pat. No. 3,531,205.

Thus, dehydration can be achieved, for example, by adding halogenides of, e.g., Cl, F, Br, or I, to the blend or by the incorporation of halogenides in the glass. The dehydration occurs in accordance with the following reaction, for example:

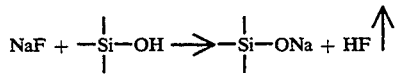

The introduction of gaseous halogens is possible but meets with technical difficulties.

Another method for chemical dehydration is the addition of carbon, for example, as pure, elemental carbon, such as graphite; as carbide; or as an organic carbon compound, such as metal oxalate. Thereby, the OH-groups are split up with the formation of readily volatile organic compounds, such as methane, for example. The carbon is preferably added in an amount of 0.01–2.0% by weight of the blend.

However, due to the thus-produced strong reducing conditions, this process, can only be utilized for glass melts substantially devoid of polyvalent components and, in particular, also substantially free of ingredients easily reducible to the elemental condition.

2. Physical Dewatering

In this method, the $H_2O$ partial pressure above the melt is reduced to such an extent that the OH-content in the melt is decreased by diffusion phenomena. See, for example, British Patent No. 948,301.

For this purpose, a vacuum is generated above the melt, for example by evacuation of the furnace space.

Preferably, a vacuum of less than 500 mbar is applied. However, very expensive apparatus is needed for continuous processes using this method inasmuch as the diffusion phenomena take place substantially only on the surface of the melt, i.e., convection currents must be produced in the melt in order to attain adequate dewatering.

Another problem of the vacuum method resides in that glass components having a low vapor pressure, such as, for example, alkali oxides, can vaporize, at least in part, and thereby alter the glass composition in an uncontrollable manner.

Therefore, it is more advantageous in any event to pass dry gases through the melt for dewatering purposes. For example, the gases may be bubbled through the melt using suitable means therefor.

For example, by diffusion of the OH-ions into the thus-produced gas bubbles which exhibit a very low $H_2O$ partial pressure, a melt is very effectively dewatered at practical expense. In this connection, gases should be used which can be removed from the melt easily and without reacting with the melt components, such as, for example, He, $CO_2$, $O_2$, $N_2$, $NO_x$, and/or noble gases, particularly He and/or $O_2$.

3. Combination of Chemical and Physical Dewatering

A process, for example, wherein dried gases are introduced into the melt which is doped with halogenides is a particularly effective and economical method for dewatering the melt to such an extent that OH-absorption in the infrared spectral region is considerably reduced.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents, and publications, cited herein, and of corresponding German P 43 21 373.1, filed Jun. 26, 1993, are hereby incorporated by reference.

EXAMPLES

Example 1

A basic glass suitable for producing glass-ceramic, from the crystallizable glass system of $LiO_2$-$Al_2O_3$-$SiO_2$, for example of the following composition (in weight percent):

$SiO_2$, 64; $Al_2O_3$, 22.1; $Li_2O$, 3.5; $Na_2O$, 0.6; BaO, 2.0; ZnO, 1.7; MgO, 0.5; $TiO_2$, 2.4; $ZrO_2$, 1.6; $Sb_2O_3$, 1.3; and $V_2O_5$, 0.3, was made into a melt from conventional raw materials in a 5-liter platinum crucible at 1580° C.

During the melting step, 2.5 l of $CO_2$ per minute was introduced into the melt by way of an inlet pipe with several ejection nozzles.

The gas was previously dried by means of silica gel and a molecular sieve column (dew point about −70° C.).

After the blend had been completely melted, 5 l/min of $CO_2$ was fed into the melt for another 2 hours.

Subsequently, $O_2$ was introduced for 30 minutes, likewise at 5 l/min, the oxygen also having been dried beforehand.

Thereafter the melt was refined for 3 hours at 1520°–1600° C.

If covering of the crucible is possible only conditionally, gas purging of the furnace space and/or of the melt surface is carried out.

In the example, 8 l/min of dried argon (dew point about −70° C.) was passed over the melt during the entire treatment period of the melt.

After refining, the melt was homogenized, poured into a mold, and cooled at 7° C./h.

A part of the cooled glass block was then made into a ceramic, as follows:

The block was heated at 4° C./min to 720° C., maintained at 720° C. for one hour, heated at 2° C./min to 880° C., maintained at 880° C. for 90 minutes, and finally allowed to cool to room temperature after turning off the furnace.

Figure 2:
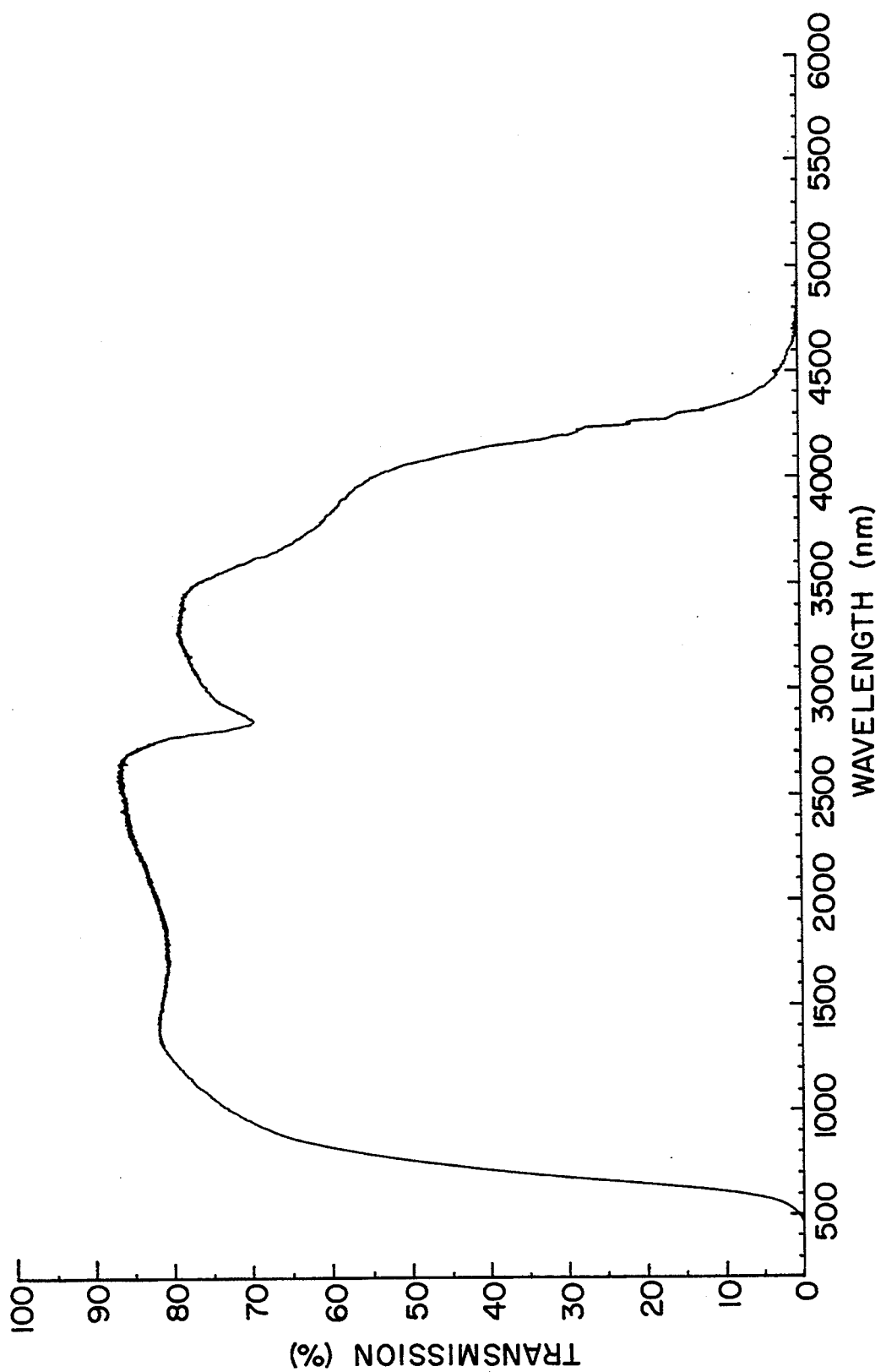
FIG. 2 is a graph of the transmission against wavelength for the glass ceramic prepared in Example 1 below.

FIG. 1 shows the transmission of the cooled glass; FIG. 2 shows the transmission of the ceramed (i.e., subjected to ceraming) specimen. Both specimens had a thickness of 3 mm.

Example 2

Shards of a halogenide-containing glass of the following composition (in weight percent):

$SiO_2$, 63; $Al_2O_3$, 23.3; $Li_2O$, 3.7; $Na_2O$, 0.5; MgO, 0.5; ZnO, 1.6; BaO, 2.0; $TiO_2$, 2.4; $ZrO_2$, 1.7; $V_2O_5$, 0.3; and NaCl, 1.0, were melted at 1580° C. under atmospheric conditions in a platinum crucible, as in Example 1.

The further procedure corresponds exactly to that of Example 1, except that helium is used in place of $CO_2$.

Figure 3:
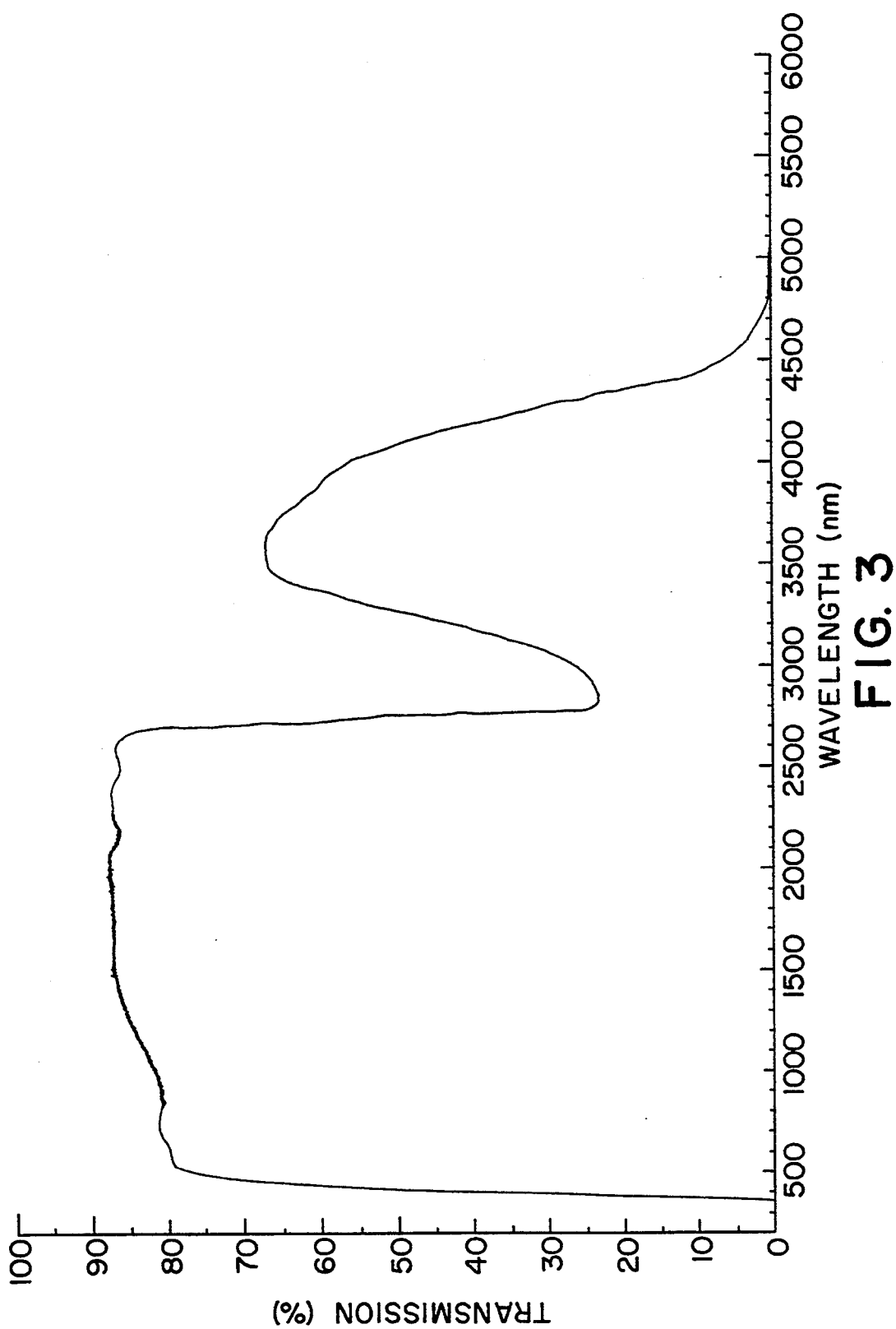
FIG. 3 is a graph of the transmission against wavelength for the cooled glass prepared in Example 2 below.
Figure 4:
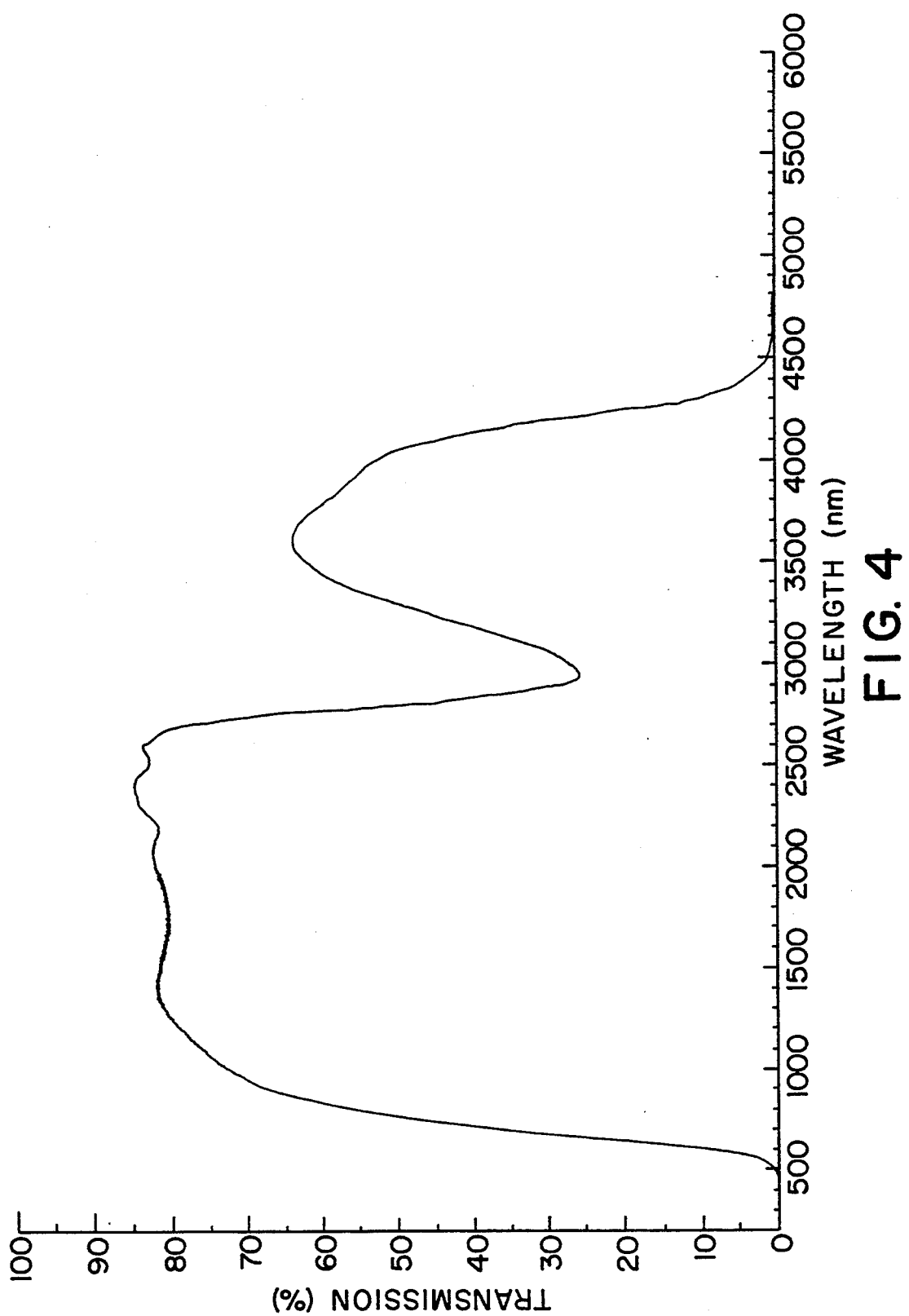
FIG. 4 is a graph of the transmission against wavelength for the glass ceramic prepared in Example 2 below.

FIG. 3 shows the transmission of the cooled glass block obtained according to this mode of operation. FIG. 4 shows the transmission of the ceramed specimen (thickness=3 mm).

Example 3

A basic glass, suitable for producing glass-ceramic and having the following composition (in weight percent):

$SiO_2$, 55; $Al_2O_3$, 26.5; $Li_2O$, 3.6; $K_2O$, 0.6; MgO, 1.1; ZnO, 1.5; $TiO_2$, 2.2; $ZrO_2$, 1.8; $P_2O_5$, 7.0; $As_2O_3$, 0.7; and NaF, 1.5, was "dewatered" in an electrically heated tank furnace at temperatures of 1580° C. in the melting section, by the introduction of a dried helium-oxygen mixture (respectively 50 vol %) as well as the simultaneous passing over of dried air (dew point of the gases approximately −70° C).

For this purpose, an agitator for gas feeding with several ejection nozzles was introduced in the melting-down section into the melt in such a way that the introduced gas could be distributed uniformly and with an average diameter of the bubbles of about 5 mm over a large region of the melting basin. Subsequent refining of the melt took place according to conventionally known methods.

Figure 5:
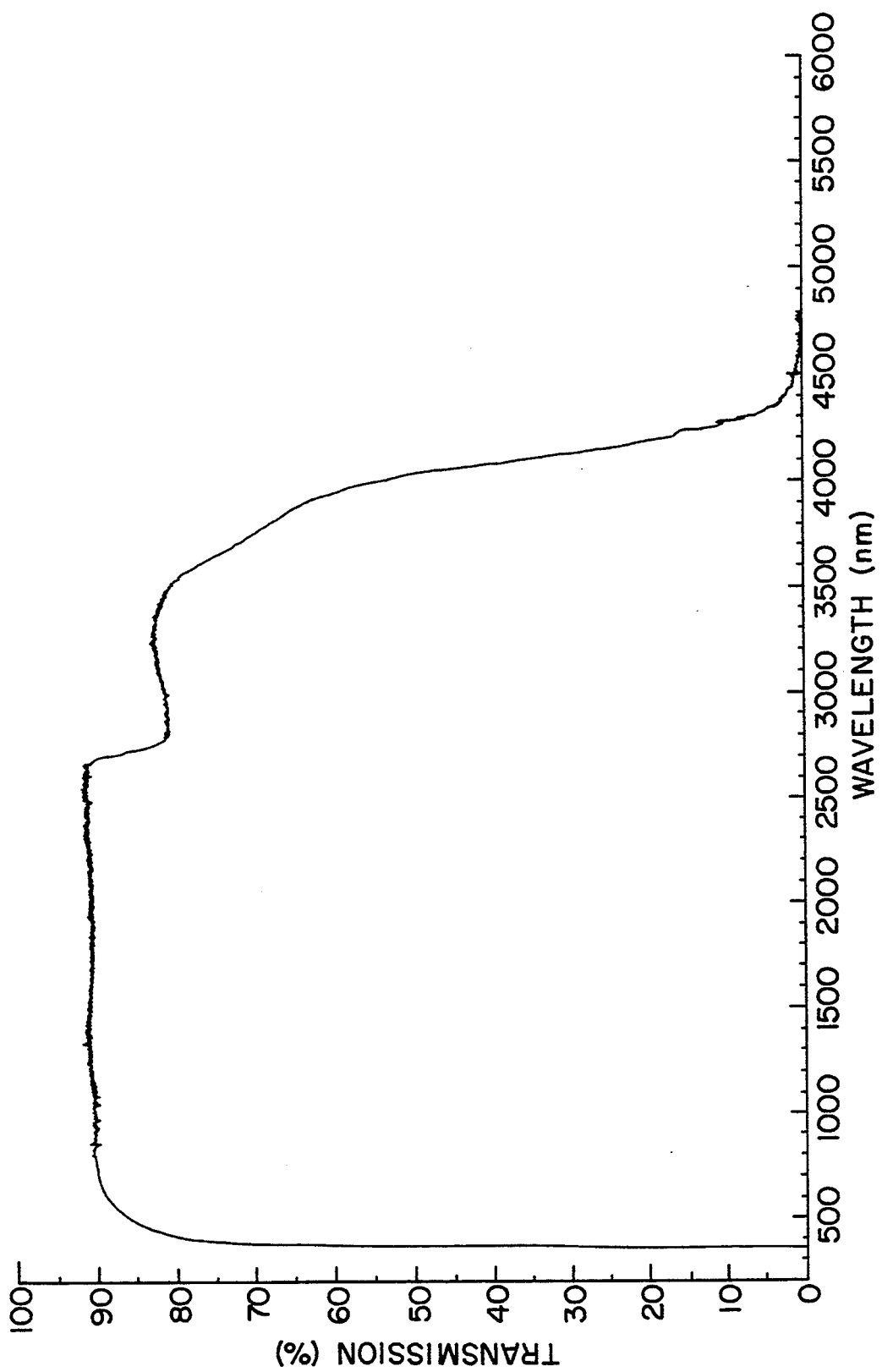
FIG. 5 is a graph of the transmission against wavelength for the cooled glass prepared in Example 3 below.
Figure 6:
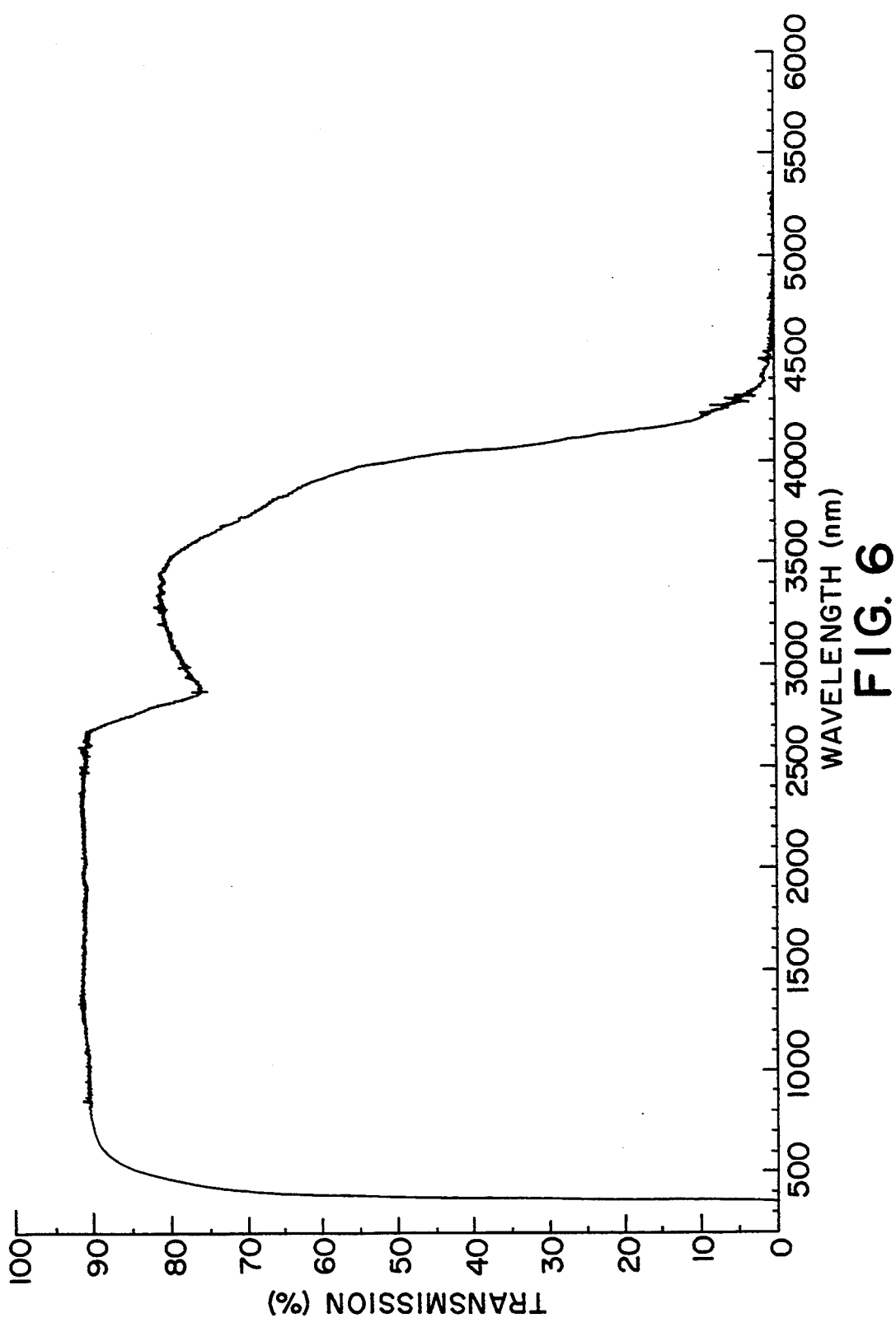
FIG. 6 is a graph of the transmission against wavelength for the glass ceramic prepared in Example 3 below.

FIG. 5 shows the transmission of the glass, not ceramed, obtained according to this example. FIG. 6 shows the transmission of the ceramed glass-ceramic specimen (thickness=3 mm).

Figure 7:
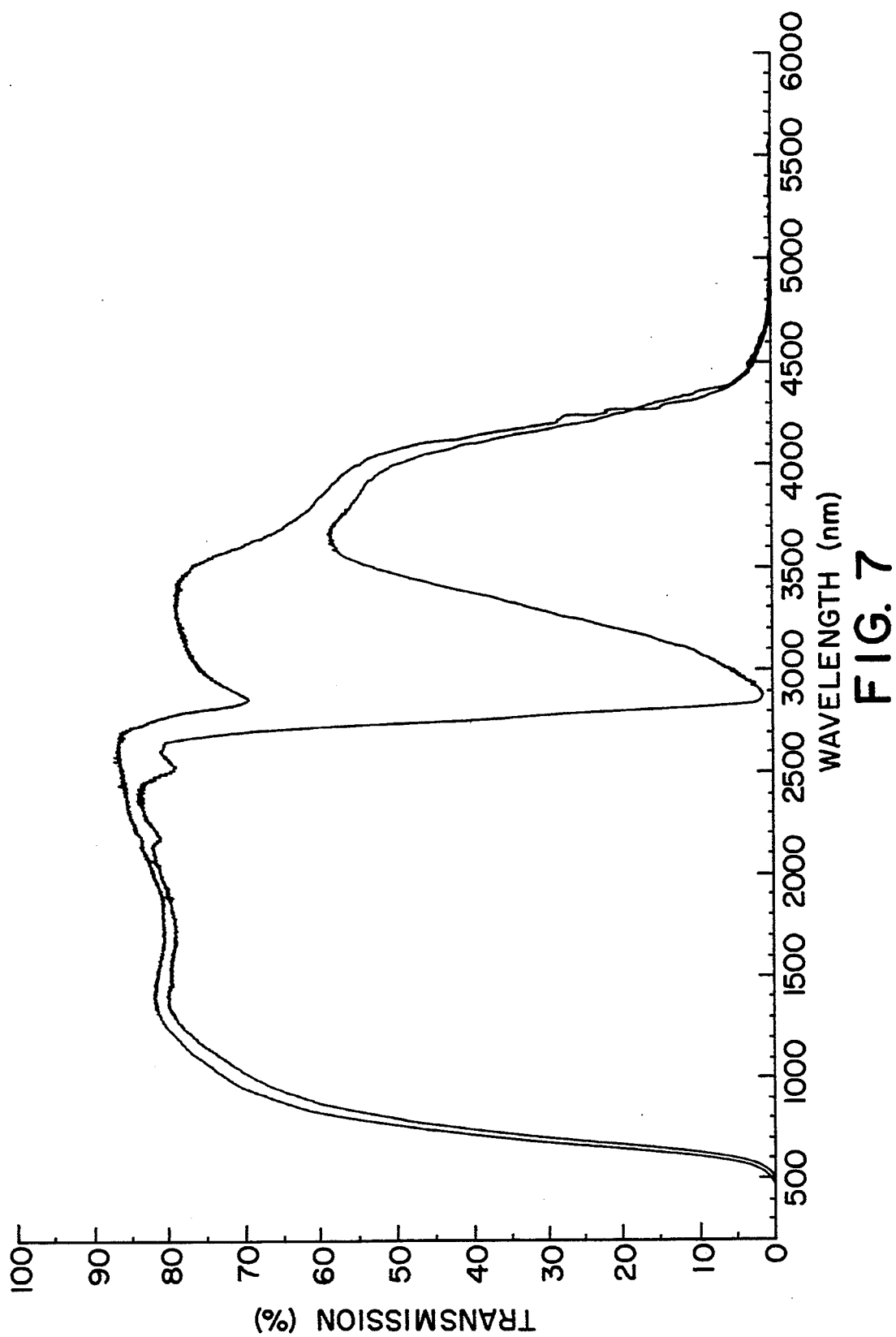
FIG. 7 contains graphs of transmission against wavelength for the glass-ceramic prepared in Example 1 below and a state of the art glass-ceramic, (CERAN "HIGHTRANS").

FIG. 7 shows the transmission (%) in dependence on the wavelength (nm) of a glass-ceramic according to the state of the art (CERAN "HIGHTRANS") and, in comparison therewith, of a glass-ceramic according to the present invention.

FIG. 7 reveals very clearly the significant increase in transmission in the wavelength range between 2500 nm and 3500 nm in a glass-ceramic according to Example 1 of this invention, as contrasted with conventional materials. While, in conventional glass-ceramic materials, the transmission in this region can drop to values of below 3% (at about 2900 nm), the transmission in glass-ceramics according to the invention can always be maintained at markedly above 60%.

Example of Application of Invention

The use of a material according to the invention for cooking surfaces is one advantageous application of the invention.

At present, a brief heating-up time can be obtained in cooking stoves with a glass-ceramic top by the use of cookware in close planar contact therewith. However, if the consumer has cookware with a bulging bottom, the heating-up time is drastically increased. When using a surface according to the state of the art, an enameled "poor" cookware having a curvature of 4.5 mm requires a heating time of 12.4 minutes to boil 2 l of water, whereas "good" cookware with a curvature smaller than 1 mm requires only 10.4 minutes to boil.

With the use of a glass-ceramic according to the present invention, the heating-up time, due to the higher proportion of direct radiation, is shorter for the case of the "good" cookware, requiring only 9.7 minutes to boil 2 l of water. More important is the improvement in case of the "poor" cookware. In this case, a heating-up time of 10.7 minutes is obtained (as compared with 12.4 minutes; see above). The cooking facility using the materials of the invention thus offers a power heating ability that is just about independent of the cookware quality. If stainless-steel cookware is utilized, which absorbs heat radiation less well, there is still a considerable improvement over the state of the art, i.e., 12.2 heating-up time compared to 13.2 min for 2 l of water. The dependency of the heating-up period on the pot quality is reduced to $\frac{2}{3}$.

The total transmission for the radiation of grill spits or open heating coils (750°–1000° C.), calculated from the spectral emission of black body radiation at a certain temperature and the spectral transmission of the cover plate, for a CERAN ® color commercial product, can be increased, for example, from 18% to 25% (and thus by a factor of 1.4), when treated in accordance with the claimed invention.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A transparent or translucent inorganic material with an average thermal longitudinal expansion coefficient $\alpha$ of from $-1 \times 10^{-6}$ to $+2 \times 10^{-6} K^{-1}$ at a temperature range of from $-50°$ C. to $700°$ C., with a composition, in weight percent, of:

$Li_2O$, 2.5–6.0; $Na_2O$, 0–4.0, $K_2O$, 0–4.0; $Na_2O+K_2O$, 0.2–4.0; MgO, 0–3.0; ZnO, 0–3.0; BaO, 0–3.5; CaO, 0–1.0; SrO, 0–1.0; $Al_2O_3$, 18–28; $SiO_2$, 50–70, $TiO_2$, 1.0–7.0; $ZrO_2$ 0–3.5; $TiO_2+ZrO_2$ 1.0–7.0; and $P_2O_5$, 0–8.0, optionally with coloring components, in weight percent:

$V_2O_5$, 0–2.0; $Cr_2O_3$, 0–2.0; $MnO_2$, 0–2.0; $Fe_2O_3$, 0–2.0, CoO, 0–2.0; and NiO, 0–2.0, optionally with high quartz and/or keatite mixed crystals and, optionally, with conventional refining agents, wherein the inorganic material has a water content of less than 0.03 mol/l and wherein the transmission through a component of the material having a thickness of 3 mm is more than 10% in the entire wavelength range between 2700–3300 nm.

2. The inorganic material of claim 1, wherein the water content is less than 0.01 mol/l.

3. The inorganic material of claim 1, wherein the water content is less than 0.005 mol/l.

4. The inorganic material of claim 2, wherein the transmission through a component of the material having a thickness of 3 mm is more than 40% in the entire wavelength range between 2700–3300 nm.

5. The inorganic material of claim 2, wherein the transmission through a component of the material having a thickness of 3 mm is more than 60% in the entire wavelength range between 2700–3300 nm.

6. The inorganic material of claim 1, which is a glass-ceramic having high quartz and/or keatite mixed crystals as an essential crystalline phase.

7. The inorganic material of claim 1, wherein the refining agents are $As_2O_3$, $Sb_2O_3$, NaCl, $Ce_2O_3$, or mixtures thereof.

* * * * *